(12) United States Patent
Dow et al.

(10) Patent No.: US 12,055,395 B2
(45) Date of Patent: *Aug. 6, 2024

(54) REFINING AN ECOLOGICAL NICHE MODEL

(71) Applicant: INTERNATIONAL BUSINESS MACHINES CORPORATION, Armonk, NY (US)

(72) Inventors: Eli M. Dow, Pleasant Valley, NY (US); Jessie Yu, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 878 days.

This patent is subject to a terminal disclaimer.

(21) Appl. No.: 17/128,520

(22) Filed: Dec. 21, 2020

(65) Prior Publication Data

US 2021/0108925 A1    Apr. 15, 2021

Related U.S. Application Data

(63) Continuation of application No. 15/475,715, filed on Mar. 31, 2017, now Pat. No. 10,900,786.

(51) Int. Cl.
*G01C 15/00* (2006.01)
*G01C 13/00* (2006.01)
(Continued)

(52) U.S. Cl.
CPC ............. *G01C 21/20* (2013.01); *G01C 13/00* (2013.01); *G01C 15/00* (2013.01); *G06F 30/20* (2020.01); *G06F 2111/10* (2020.01); *G06N 20/00* (2019.01)

(58) Field of Classification Search
CPC ........ G01C 21/20; G01C 13/00; G01C 15/00; G06F 30/20; G06F 30/25; G06F 30/27;
(Continued)

(56) References Cited

U.S. PATENT DOCUMENTS 7,328,511 B2  2/2008  Misu
7,764,810 B2  7/2010  Rahmes
(Continued)

FOREIGN PATENT DOCUMENTS

CN   101248766 A   8/2008
CN   102436541 A   5/2012
(Continued)

OTHER PUBLICATIONS

Kohut, et al., "Toward Dynamic Marine Spatial Planning Tools: Can we inform fisheries stock assessments by using dynamic habitat models informed by the Integrated Ocean Observing System (IOOS)?" (Year: 2014).*

(Continued)

*Primary Examiner* — John E Johansen
*Assistant Examiner* — Alfred H B Wechselberger
(74) *Attorney, Agent, or Firm* — CANTOR COLBURN LLP; Teddi Maranzano (57) ABSTRACT

Refining an ecological niche model (ENM) associated with a geospatial location includes developing a fluid dynamics model based on measurements generated by a device deployed into fluid flows of the geospatial location. The measurements include temperature and velocity field, depth and particle transport measurements. The refining further includes refining and running the fluid dynamics model using measurements regenerated from the device being redeployed into the fluid flows to produce an output. This output is descriptive of fluid dynamics at the geospatial location and input into the ENM. The ENM is run to produce a baseline ENM output descriptive of a probability of a species existing at the geospatial location. In addition, the ENM is run with a limnologic modification to produce a predictive ENM output descriptive of a predictive probabil- (Continued)

ity of the species existing at the geospatial location that is comparable to the baseline ENM output.

16 Claims, 6 Drawing Sheets

(51) Int. Cl.
  *G01C 21/20* (2006.01)
  *G06F 30/20* (2020.01)
  *G06F 111/10* (2020.01)
  *G06N 20/00* (2019.01)

(58) Field of Classification Search
  CPC .. G06F 30/28; G06F 2111/00–2119/22; G06N 20/00
  See application file for complete search history.

(56) References Cited

U.S. PATENT DOCUMENTS

| | | | |
|---|---|---|---|
| 9,399,676 | B2 | 7/2016 | Schurpf |
| 10,900,786 | B2 | 1/2021 | Dow et al. |
| 2003/0023416 | A1 | 1/2003 | Peterson |
| 2007/0013908 | A1 | 1/2007 | Lee |
| 2010/0023276 | A1 | 1/2010 | Gupta |
| 2014/0278323 | A1 | 9/2014 | Wright |
| 2018/0285749 | A1 | 10/2018 | Dow |

FOREIGN PATENT DOCUMENTS

| | | |
|---|---|---|
| IN | 205242352 A | 5/2016 |
| WO | 2013153402 A1 | 10/2013 |

OTHER PUBLICATIONS

Gomaa, H. "Environmental Assessment Criteria to be Taken into Consideration for Selection of Locations of Petroleum Projects" (Year: 2012).*

Merza, S. "Design of Miniaturized Underwater Vehicle with Propulsions for Deep-sea Research Applications" [Thesis] Arizona State University [retrieved on Feb. 10, 2024] (Year: 2014).*

O'Donnell et al. "Resolution of Impacts of Runoff Events on a Water Supply Reservoir With a Robotic Monitoring Network" Journal of the American Water Resources Association, Apr. 2006. pp. 323-333 [retrieved on May 29, 2024] (Year: 2006).*

Hood, W. Gregory "Habitat Monitoring Strategy for the Tidal Skagit Delta Integrating Landscape and Site-scale Perspectives" Skagit River System Cooperative [retrieved on May 29, 2024]. Retrieved <<http://skagitcoop.org/wp-content/uploads/Monitoring-Strategy-for-the-Skagit-Delta-Ecosystem-FINAL.pdf>> (Year: 2009).*

Effler et al. "Use of Robotic Monitoring to Assess Turbidity Patterns in Onondaga Lake, NY" Lake and Reservoir Management vol. 22, No. 3, pp. 199-212 [retrieved on May 29, 2024] (Year: 2006).*

Anonymous "Methods of Analyzing the Geochemical and Microstructural Development of Shales During Artificial Thermal Maturation", IP.com No. IPCOM000225695D; 2013, 11 pages.

Gomaa, Hassn M. "Environmental Assessment Criteria to be Taken into Consideration for Selection of Locations of Petroleum Projects", IPCOM000219892D; 2012, 36 pages.

Huler, Scott "Duke Magazine", 2017, 9 pages.

IBM, "An apparatus and method for generating configurable and controllable digital plants in virtual world using multi-layers control model and fractal technology", IP.com No. IPCOM000193086D; 2010, 4 pages.

Kohut, Josh et al., "Toward Dynamic Marine Spatial Planning Tools: Can we inform fisheries stock assessments by using dynamic habitat models informed by the Integrated Ocean Observing System (IOOS)?", IEEE, 2014, pp. 1-7 (Year: 2014).

IBM: List of IBM Patents or Patent Applications Treated as Related (Appendix P); Date Filed: Jun. 6, 2024; 2 pages.

* cited by examiner

REFINING AN ECOLOGICAL NICHE MODEL

DOMESTIC PRIORITY

This application is a continuation application of the legally related U.S. Ser. No. 15/475,715 filed Mar. 31, 2017 and published as U.S. Patent Publication No. 2018-0285749 on Oct. 4, 2018, the contents of which are incorporated by reference herein in their entirety.

BACKGROUND

The present invention generally relates to ecological niche modeling (ENM) and, more specifically, to refining ENM for a geospatial location using a fluid dynamics model with particle transport measurements.

ENM refers to the process of using computer algorithms to predict the distribution of species in geographic space on the basis of a mathematical representation of their known distribution in environmental space. The environment in most cases is represented as climate data but other variables such as soil type, water depth, and land cover can also be used. The models allow for interpolating between a limited number of species' occurrences and are useful in research areas related to conservation biology, ecology, and evolution.

There are a number of motivations for using ENM to understand the range of environmental conditions suitable for a species' survival in the absence of inter-species interactions given a set of environmental parameters. For example, a nascent application of ENM is the projection of species' distributions under climate change scenarios. Here, an understanding of critical species' fundamental niches allows forecasters to predict changes in populations as climate shifts occur over time. Another use of ENM is in the prediction of invasive species' habitats in "un-invaded" regions. Invasive species can cause significant damage to the ecosystems that they invade and can thus exert harmful impacts on life that is reliant on those ecosystems. Understanding the fundamental niches of invasive species allows for identification of at risk locations and can potentially limit the search space for entities interested in seeking out their locations in non-native ecosystems.

SUMMARY

Embodiments of the present invention are directed to a computer-implemented method for refining an ecological niche model (ENM) associated with a geospatial location. A non-limiting example of the computer-implemented method includes developing a fluid dynamics model based on measurements generated by a device deployed into fluid flows of the geospatial location. The measurements include temperature and velocity field, depth and particle transport measurements. The method further includes refining and running the fluid dynamics model using measurements regenerated from the device being redeployed into the fluid flows to produce an output descriptive of fluid dynamics at the geospatial location and inputting the output into and running the ENM to produce a baseline ENM output descriptive of a probability of a species existing at the geospatial location. The method also includes running the ENM with a limnologic modification to produce a predictive ENM output descriptive of a predictive probability of the species existing at the geospatial location that is comparable to the baseline ENM output.

Embodiments of the invention are directed to a computer program product for refining an ecological niche model (ENM) associated with a geospatial location

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, traditional or conventional ENM often describes species probably in a given geospatial location based on only partial characteristics of that spatial location. This has traditionally been due to the fact that ENM often does not consider the contribution of fluid dynamics in and around the geospatial location. For example, while certain species of aquatic plant and animal life are dependent on environmental conditions such as chemical concentrations in surrounding water and the velocities of currents of that water which allow or prevent species from taking root, ENM is typically only concerned with water depths and temperature and velocity field measurements and generally does not given consideration to particle transport, diffusion and invection measurements (e.g., measurements of sedimentation and the movement of nutrients through water).

Turning now to an overview of the aspects of the invention, one or more embodiments of the invention address the above-described shortcomings of the prior art by providing for refinements of ENM by way of fluid dynamics modeling that takes into account at least temperature and velocity field, depth, and particle transport measurements.

The above-described aspects of the invention address the shortcomings of the prior art by the development of a fluid dynamics model that is based on measurements generated by a device deployed into fluid flows of the geospatial location. The measurements include temperature and velocity field, depth and particle transport measurements. Further, the fluid dynamics model is refined and run using measurements regenerated from the device being redeployed into the fluid flows to produce an output descriptive of fluid dynamics at the geospatial location. In addition, the output is input into the ENM whereupon the ENM is run to produce a baseline ENM output descriptive of a probability of a species existing at the geospatial location. Finally, the ENM is run with a limnologic modification to produce a predictive ENM output descriptive of a predictive probability of the species existing at the geospatial location that is comparable to the baseline ENM output.

Figure 1:
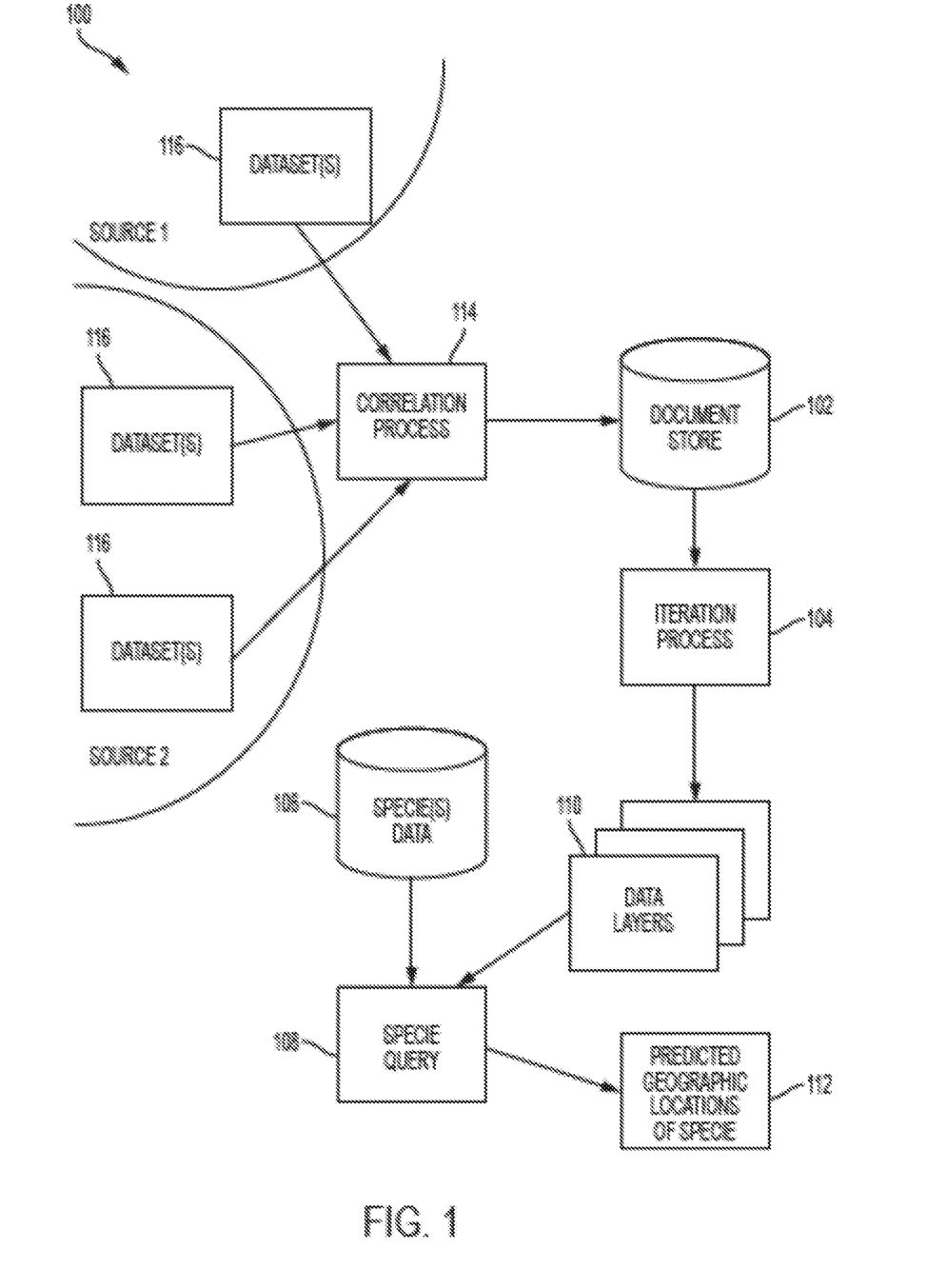

Turning now to a more detailed description of aspects of the present invention, with reference to FIG. 1, components of a flexible ENM processing framework 100 are generally shown according to one or more embodiments. The ENM framework 100 shown in FIG. 1 includes a correlation process 114 that receives datasets 116 from several sources (Source 1 and Source 2 are shown in FIG. 1). The correlation processor 114 correlates the datasets 116 and then stores the correlated datasets 116 in a document store 102. In accordance with one or more embodiments, the datasets 116 are disparate in that they have a plurality of different contents and formats and can include, for example, geospatial referenced gridded datasets that specify values of environmental parameters for corresponding geospatial locations. Examples of sources of the datasets 116 include, but are not limited to: data from National Climatic Data Center (NCDC), National Oceanic & Atmospheric Administration (NOAA), Web Soil Survey (WSS), Global Biodiversity Information Facility (GBIF), U.S. Geological Survey (USGS) and Geofabrik. The data can be received in any format such as, but not limited to: gridded data files such as netCDF, gridded binary (GRIB) format variants, georeferenced comma-separated values (CSVs) and/or raster based formats such as GeoTIFF.

The datasets can use different terminology for geospatial locations and/or environmental parameters. As part of the correlation process 114, the different names can be connected so that they use common terminology before being stored in the semi-structured document store 102. For example, one source may refer to latitude as "lat" and another source may refer to latitude as "latitude." The correlation process 114 can include a program written by a programmer to connect "lat" and "latitude" and to refer to both as "latitude" or some other common label. The correlation process indexes the datasets 116 into annotated document structures (e.g., semi-structured documents) by aggregating data sources together. In one or more embodiments correlation is implemented by one or more code modules per data source for each of the input file formats to be supported. In each module that supports an input file type, software checks can seek out a plurality of heuristic terms dealing with geospatial location. For instance, sample terms defining equivalent geospatial concepts include the terms "lat", "latitude", and Latitude. The input files can be parsed, and during the parsing stage or upon completion of parsing those terms and associated values are recognized for those terms. At a minimum, input file parsers detect at least one coordinate/value pair for geo-referencing. Anything else that can be heuristically or mechanistically extracted as key/value pairs is optional but can be useful as annotations and indexed in the same document or a linked document containing the required geo-reference key value pair.

In cases where multiple variants of the same geospatial concept term are found within a document, they can be merged or entered with their corresponding values as separate fields in the document store. To join values from sources across document stores, the required geolocation reference can be used as the primary joining value. Since every measurement is described by either a pointwise latitude/longitude pair (or in the general case a bounding polygon to define regions with less overhead than enumerating each point within the region), spatial search can be utilized, for instance the spatial search found in Apache Solr, to find relations based on geospatial location across the other arbitrary key value pairs that were not geospatial in nature. By importing annotated data sets from OpenStreetMap, embodiments are able to define a mapping of natural language place names to the corresponding coordinates/polygons defining those locations.

In the examples described herein, the document store 102 is implemented using Apache Solr from the Apache Software Foundation and the tool used to define a geographic region made up of geospatial locations is OpenStreetMap. OpenStreetMap data includes polygons that describe different regions, allowing these polygons to be retrieved by name. Once a polygon is retrieved, a bounding box is determined from the polygon and used to search for data for the model being generated. In one or more other embodiments, the ENM framework utilizes other tools such as, but not limited to: ArcGIS from Esri and Geospatial Data Abstraction Library (GDAL) from the Open Source Geospatial Foundation. ArcGIS is a geographic information system (GIS) for working with maps and geographic information. It can be used for: creating and using maps, compiling geographic data, analyzing mapped information, sharing and discovering geographic information, using maps and geographic information in a range of applications and managing geographic information in a database. GDAL is a computer software library for reading and writing raster and vector geospatial data formats. As a library, it presents a single abstract data model to the calling application for all supported formats.

The document store 102 contains values of environmental parameters measuring weather related phenomena, species occurrences, human population, soil types, land cover, elevation and OpenStreetMap data. Maps from OpenStreetMap can be combined with niche model relevant data to create models based on named geographic regions. Examples of environmental parameters, or environmental data, include, but are not limited to: mean annual temperature, mean diurnal temperature range, isothermality, temperature seasonally, maximum temperature of warmest month, minimum temperature of coldest month, temperature annual range, annual mean precipitation, precipitation of the wettest month, precipitation of the driest month, precipitation seasonally, diurnal temperature range, frost-free days, solar radiation, annual mean monthly minimum temperature, annual mean monthly maximum temperature, vapor pressure, wet days, actual and potential evapotranspiration, moisture deficit and surplus, soil moisture, normalized difference vegetation index, life zones, soil class, vegetation class, vegetation type, wetlands, world ecosystems, actual forest cover, elevation, potential vegetation, proximity to coast, species occurrence data, soil types, elevation, watersheds, lakes and land use.

The components of the flexible ENM framework 100 also include an iteration process 104 for creating niche model data layers 110 based on the data in the document store. The iteration process 104 may, for example, be a top down recursion from the perspective of the food chain involving the species of interest. For instance, a particular niche for a giant panda which may have a trivially determined food source data set given the small dietary range of the species will return a different volume of results if seeking a particular niche for the hooded merganser where a simple food layer may not be on file. However, the data store can have access to food web information including the list of species and taxa or other hierarchical ontology of consumables for that duck species. By iterating over all known species that are consumed by the top level species of interest, a composite layer of an arbitrary "hooded merganser food source" layer can be created. To create this layer, it may be necessary to iterate down through the chain of species recursively determining their food web requirements to build this top most layer. For instance, the aforementioned ducks are known to eat small fish, aquatic insects, crustaceans (especially crayfish), amphibians, vegetation, and mollusks (their diet is broader than in other mergansers, which eat fish almost exclusively). Thus for a food existence layer, embodiments may need to determine iterations for individual availability of small fish, crayfish, aquatic insects and so on and ultimately creating a superset of those locations deemed to have food sources, weighted by the number and variety of food sources available at each location. In turn each layer may require lower layers still until direct lookup information can be achieved based on individual species occurrence information or heuristic rules governing occurrence assumptions.

The components in FIG. 1 also includes a species query that requests results that specify predicted geographic locations of a species 112 based on information about the species contained in the species data 106 and based on the data layers 110 which include environmental data.

Figure 2:
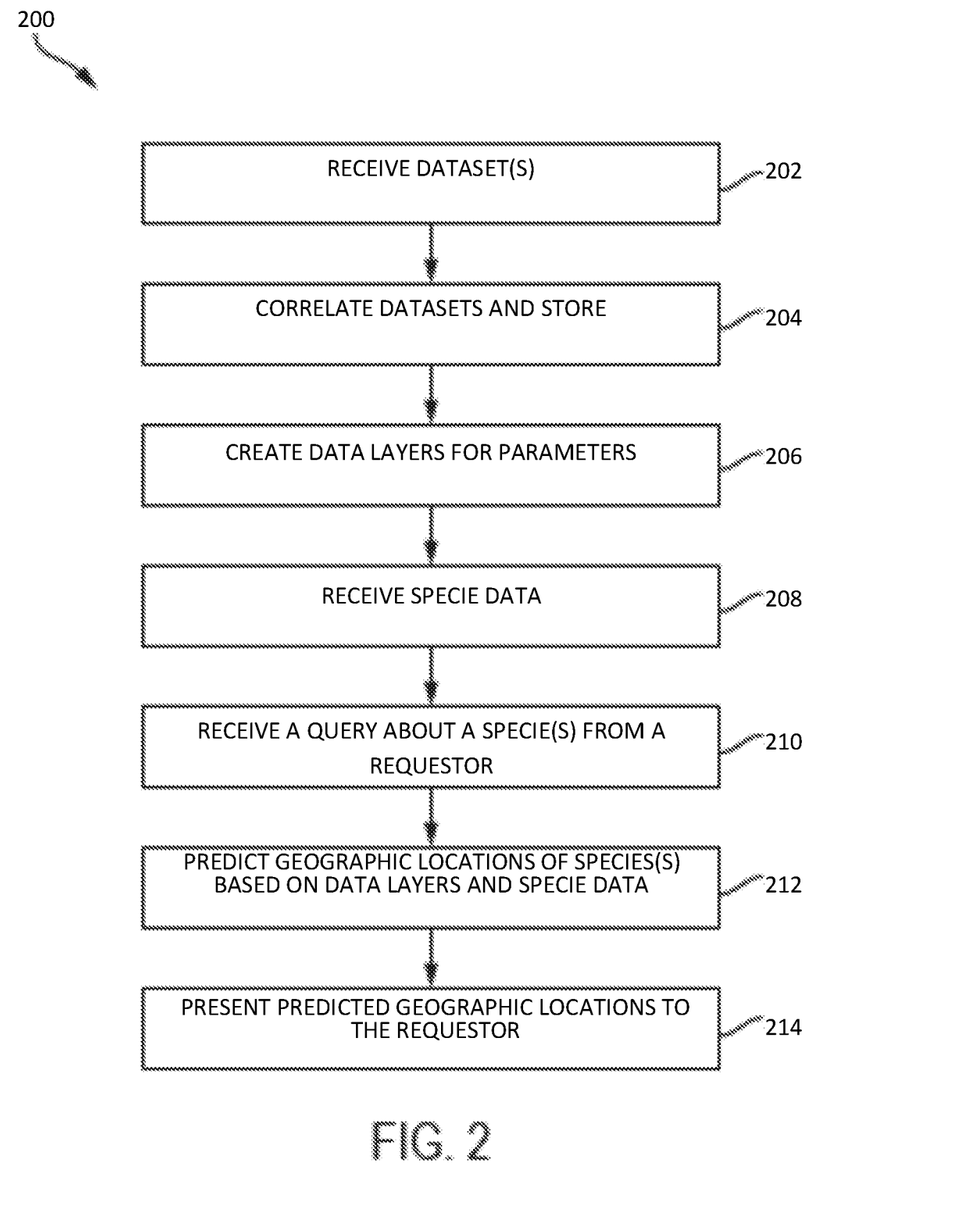

With reference to FIG. 2, a flow diagram 200 for performing ENM is generally shown in accordance with one or more embodiments. At block 202, datasets, such as datasets 116 in FIG. 1, are received from a variety of sources. As described previously, the datasets can be disparate datasets. At block 204, the disparate datasets are correlated and stored in a document store, such as document store 102 in FIG. 1. In one or more embodiments this can be performed by aggregating the plurality of disparate datasets into a document store with semi-structured attributes, with each document in the document store specifying attributes that include a geospatial location and a value of an environmental parameter at the geospatial location. The document is referred to as being semi-structured because it includes defined fields/attributes for the geospatial location and the value of the environmental parameter, and the rest of the document may include unstructured text or other information whose contents are not identified. The disparate datasets can include geospatial referenced gridded datasets and the aggregating can include indexing the datasets into annotated document structures to be stored in the document store. The environmental parameters can include, but are not limited to: climatological parameters having to do with climate; soil data parameters; land use parameters; and population density data parameters.

At block 206, data layers or niche model layers are created for the environmental parameters at the geospatial locations that are included in a specified geographic region. One layer is generated for each of the environmental parameters. In one or more embodiments, the generating includes identifying documents in the document store that contain information related to the geospatial locations and to the environmental parameter and iterating through the identified documents to determine a value of the environmental parameter at each of the geospatial locations. Also as part of the generating, a grid with cells representing the geospatial locations in the geographic area is filled in with the determined values of the corresponding environmental parameter is created, and then stored as a niche model layer for the environmental parameter.

In one or more embodiments, a niche model layer is generated for a combination of the environmental parameters. For example, for layers which are continuous valued numerical measurements over some period of time, layers that indicate the minimum, mean and maximum values over that time period can be derived. Thus, three data layers will be generated for the region of interest from a single data type.

In accordance with one or more embodiments, categorical data types use nearest neighbor interpolation for gridded data sources. For categorical data that is defined by region or polygon, simple point-in-polygon tests can be performed for each location in the blank grid to determine what value should be assigned. The creation of a grid for each parameter or data type allows the easy creation of GeoTIFF input layers which can be fed into a tool based for example, on openModeller which describes a generic approach to species' potential distribution modeling. In addition, a tool such as GeoTools can be used to handle the reading and writing of various GIS file formats.

Still referring to FIG. 2, at block 208, species data that describes environmental attributes of one or more species is received. The species data can be retrieved from the document store or from another storage location. In one or more embodiments, at least some of the environmental attributes correspond to parameters in the niche model layers. For example, an attribute may be that the species thrives in geographic locations with a low population density and not in geographic locations with a high population density. These population density attributes can correspond to a niche model layer created for a population density parameter.

At block 210, a query is received that requests information about potential geospatial locations of a particular species. In one or more embodiments, in order to generate a model, a user can enter, via the query, the name of a place or a unique bounding box to specify the range of the model. In addition, the query can specify the species for which the model will be generated by entering the scientific or common name. In addition, the query can specify which input layers to use in the model creation, or let the systems make that determination. In one or more embodiments, the default is for the system to start by including all of the niche model layers and then to remove layers that appear to be very similar to one another in the specified region.

In one or more embodiments, in order to initiate model generation, a user interface can be accessed. The user can create a model by clicking on a "Generate Model" tab on a user interface screen and following the instructions. The user interface can prompt the user to fill in three form fields in order to create the model: a first text field asking for the user to enter the name of a location of interest for the model (this area determines the bounding box which the model is projected onto), a second text field that prompts the user for the name of the species in question (and can auto-complete both scientific and common names which will provide the string that is used in the database query for occurrences and a checkbox field that allows the user to select which layers are relevant to the niche model for the given species.

In one or more embodiments blocks 206 and 208 are performed after block 210 and only for the requested species and geographic region specified by the query in block 210.

At block 212, the future geospatial location of the species is predicted based on environmental attributes of the species and contents of the niche model layers. In one or more embodiments, the predicting includes generating a composite grid with cells representing the geospatial locations. The composite grid can be generated by using niche model layers as a set of filters for ruling out potential geospatial locations represented by cells in the grid. Once the user has entered the information described above in reference to block 210, model creation begins at block 212. In one or more embodiments, the relevant data are queried and both data and occurrence points that exist inside the bounding box of the region are determined. From these returned data, the highest resolution dataset can be determined. This highest resolution grid can be set as the common grid to which all layers will be normalized. In one or more embodiments, normalization is performed by generating a blank grid for each data type and then interpolating, from the original data points, the values of each point on the blank grid. For weather related variables, Barne's interpolation can be used, while for other types of environmental data a simple bi-linear interpolation can be used.

In accordance with one or more embodiments, once the user has input the parameters for model creation, a bounding box is generated for the named region by resolving the input to the corresponding OpenStreetMap polygon, and taking the upper right and lower left corners from this polygon. Data layer and occurrence data can then be retrieved from Solr based on this bounding box. At this stage, derived layers can be computed by taking a transform of the original data, (e.g., the maximum value recorded at a geospatial location). Data layers with naturally low resolution can be interpolated to match those with higher resolution. In one or more embodiments, the layer data is fed through an algorithm relying on Geotools to create geoTIFFs which can later be used for model generation. An occurrence file can also be created at this point to be fed into the openModeller tool.

Once the layers and occurrence files have been generated, a request file is written and submitted to openModeller to generate the model. The openModeller tool can project the niche model into a TIFF formatted file.

At block 214, the predicted geographic locations are output to the requestor. In one or more embodiments, the results are overlaid on top of a geographic map. In one or more embodiments, the grid with the results is output with an indicator of the geographic region covered by the results. In addition, the individual data layers, represented as gridded datasets or in raster format, can also be output to the requestor along with model statistics. Model statics can include statistics for training data such as threshold, accuracy, omission error percentage, as well as projection statistics such as the number of grid cells where the occurrence is predicted as a percentage of the geographic region displayed, and the number of cells contained in the model underlying the output visualization.

The model projection, species occurrence data and statistical output of openModeller can all be displayed in an interactive interface. This display portal can project the model over an OpenStreetMap instance with OpenLayers and also display the data layers used to generate the model, along with the model statistics.

Figure 3:
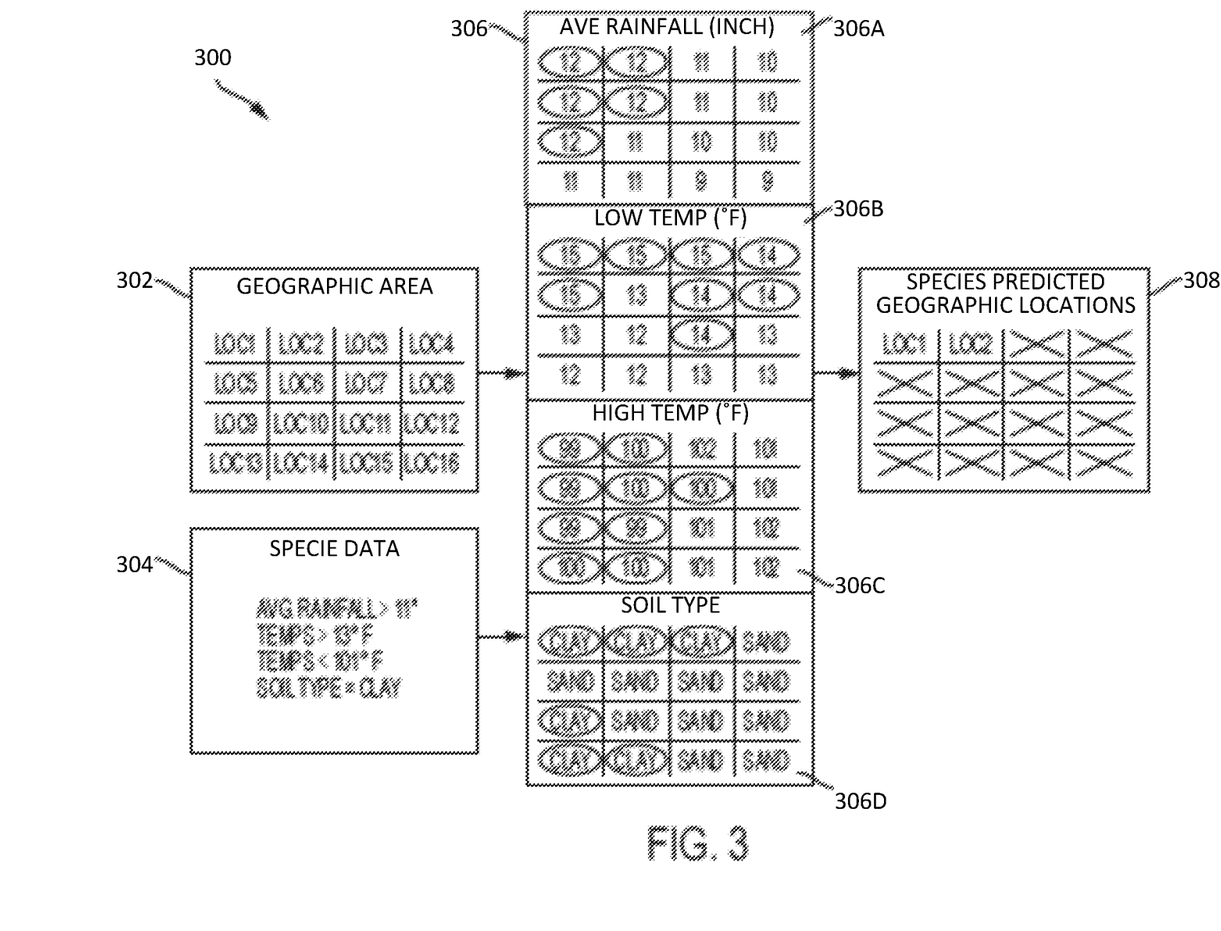

Turning now to FIG. 3, a block diagram 300 of data layers used in ENM are generally shown in accordance with one or more embodiments. The block diagram 300 shown in FIG. 3 illustrates a simplified example for explanatory purposes. FIG. 3 depicts a grid of a geographic area 302 and species data 304. In one or more embodiments, the grid of the geographic area represents sixteen geo spatial locations, which together make up the geographic region that a user has requested to be modeled. Each of the locations in the geographic area corresponds to a cell in the data layers 306 and the cells are of uniform size. Thus, the cell in the upper left corner of the average rainfall data layer 306A corresponds to "LOC 1" in the geographic area, that is, the average rainfall in the geospatial location "LOC 1" is 12 inches. Similarly, based on contents of the upper left corner of the low temperature data layer 306B, the low temperature at geospatial location "LOC 1" is 15 degrees Fahrenheit, based on contents of the upper left corner of the high temperature data layer 306C, the high temperature at geospatial location "LOC 1" is 99 degrees Fahrenheit and based on contents of the upper left corner of the soil type data layer 306D, the soil type at geospatial location "LOC 1" is clay.

In the example shown in FIG. 3, the species attributes that are available include average rainfall, high temperature, low temperature and soil type. These attributes can be input via a user query or they can be obtained from previously collected species data. The data layers used in the example shown in FIG. 3 describe values of the environmental parameters that correspond to the attributes available about the species. In one or more embodiments a filtering technique is performed to output a grid containing predicted geographic locations 308 (which correspond to the locations in the grid showing the geographic area 302) of the species. The locations circled in the grids in the data layers 306 indicate environmental parameter values that meet the criteria specified by the species data 304. The only two locations where all four environmental parameters meet the criteria are "LOC 1" and "LOC 2", and thus these are the predicted future locations of the species. In one or more embodiments, the grid containing predicted geographic locations 308 is output to a user interface device such as a display screen along with a key that describes the geospatial locations represented by the grid. In one or more embodiments, the data is overlaid on a geographic map. In addition, the data layers 306 and species data 304 used to generate the model can be output to a user.

In accordance with one or more embodiments, in order to avoid generating models with the same input parameters repeatedly, models are stored in the framework for search later on. Parameters used as input, along with output images, statistics and metadata can all be stored in Solr, and then presented to a model creator either via a search mechanism, or automatically during model creation if the input parameters to a new model closely match an existing model. This can save a user time, allow for easy comparison of already generated models and over time allow users to access a breadth of models for varying species and locations.

One or more embodiments can be utilized to create a threat model which includes not only the potential distribution of a single species, but many potential invaders which could cause harm to the environment. Models can be computed for many potential invasive species, and each ranked according to the suitability of the environment in question for that species. Since the data architecture lends itself to parallelization, it is possible to run many models in parallel to speed up such a computationally difficult task.

Figure 4:
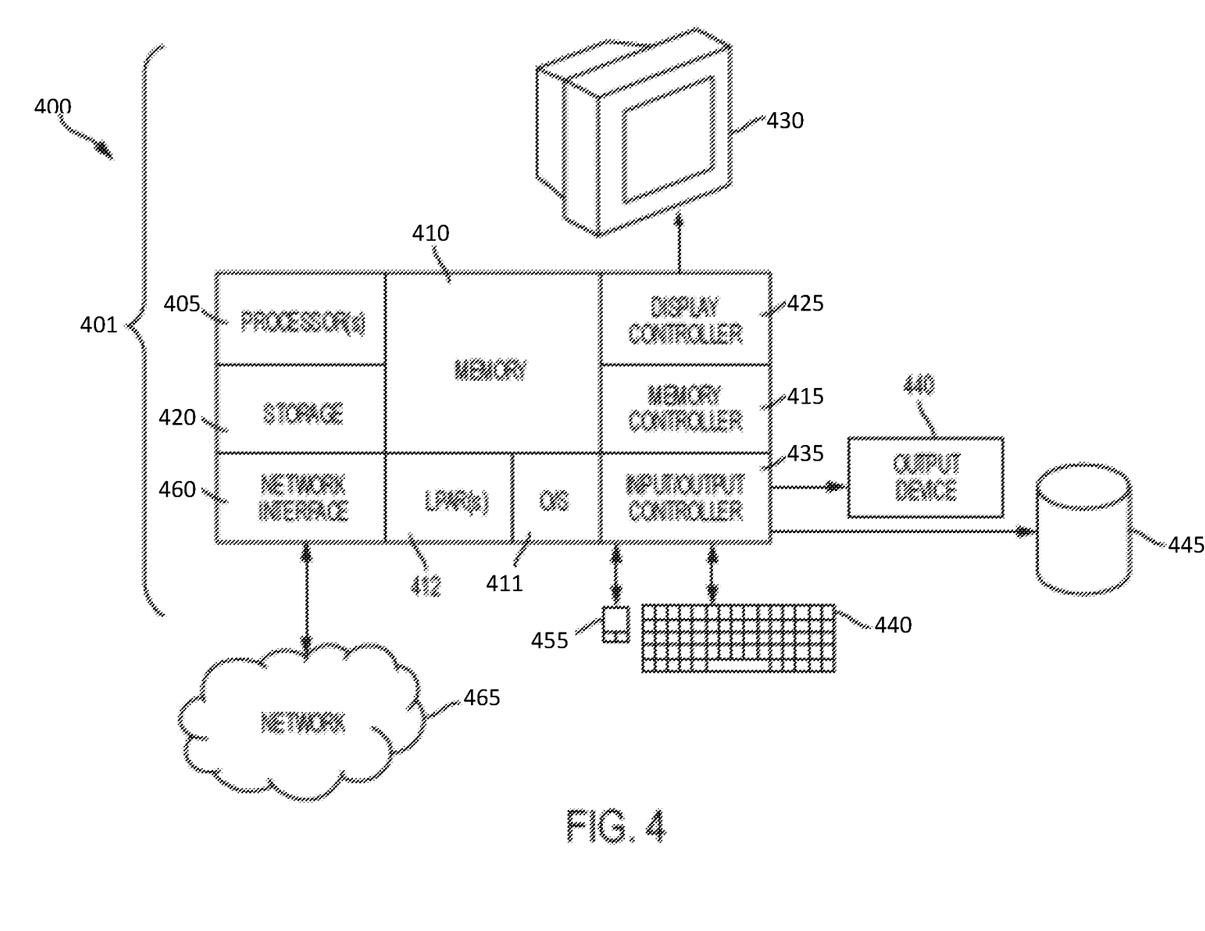

Turning now to FIG. 4, a computer system for ENM is generally shown according to one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer or mainframe computer. The system 400 therefore may include general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415 and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a microprocessor or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which includes an ordered listing of executable instructions for implementing logical functions. In the example of FIG. 4, the instructions in the memory 410 relate to a suitable operating system (OS) 411. The operating system 411 essentially controls the execution of other computer programs and provides scheduling, input-output control, file and data management, memory management and communication control and related services. In accordance with one or more embodiments, the memory 410 and/or an I/O device 445 can be used to store the document store 102 and the species data 106 described herein.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In accordance with one or more embodiments described herein, data layers are generated automatically for a given niche model and layer generation can be determined automatically or based on user input. In addition, metadata for the created input layers can be easily tracked. For example, the source of the layer's encapsulating dataset, the date it was updated, and the spatial resolution can all be tracked. In accordance with one or more embodiments, the flexible framework described herein is easy to use and allows for multiple, rapid iterations of model creation and validation. The data collection and management burden can be completely removed from the end-user who wishes to run the models. Further, the efficiency of the data architecture can allow the flexible framework to scale well with both the extent of the models being generated, and the number of models being run. Model runs can be parallelized, so that several different algorithms can be run at once, and the final model can be a blend of these individual model runs. In accordance with one or more embodiments, the data stored in the architecture is high resolution, broad geographic coverage, accurate and relevant to ENM creation. This allows for comprehensive aggregated datasets to be used by the flexible framework to generate niche model. In accordance with one or more embodiments, the flexible framework allows for easy storage of an end users custom data. Data importers can be written for many different file formats often used in geographic information systems (GIS) applications, including but not limited to: GeoTIFF, Shapefiles, ESRI ArcGrid, Erdas Imagine, OpenStreetMap XML and comma-separated values (CSV) files. In accordance with one or more embodiments, the flexible framework derives relevant data layers from types of data selected for use in a given model, which can improve model accuracy. In certain cases, these derived layers can be of greater importance to model accuracy than including new, different types of layers. For example, including average mean temperature can be more important to model accuracy than the number of layers used. In accordance with one or more embodiments, an interface of the flexible framework allows for easy statistical validation of models, as well as quick visual testing of input layers and model output. Model output can be overlaid on an interactive map, allowing local biologists to visually inspect and confirm a model's validity.

Figure 5:
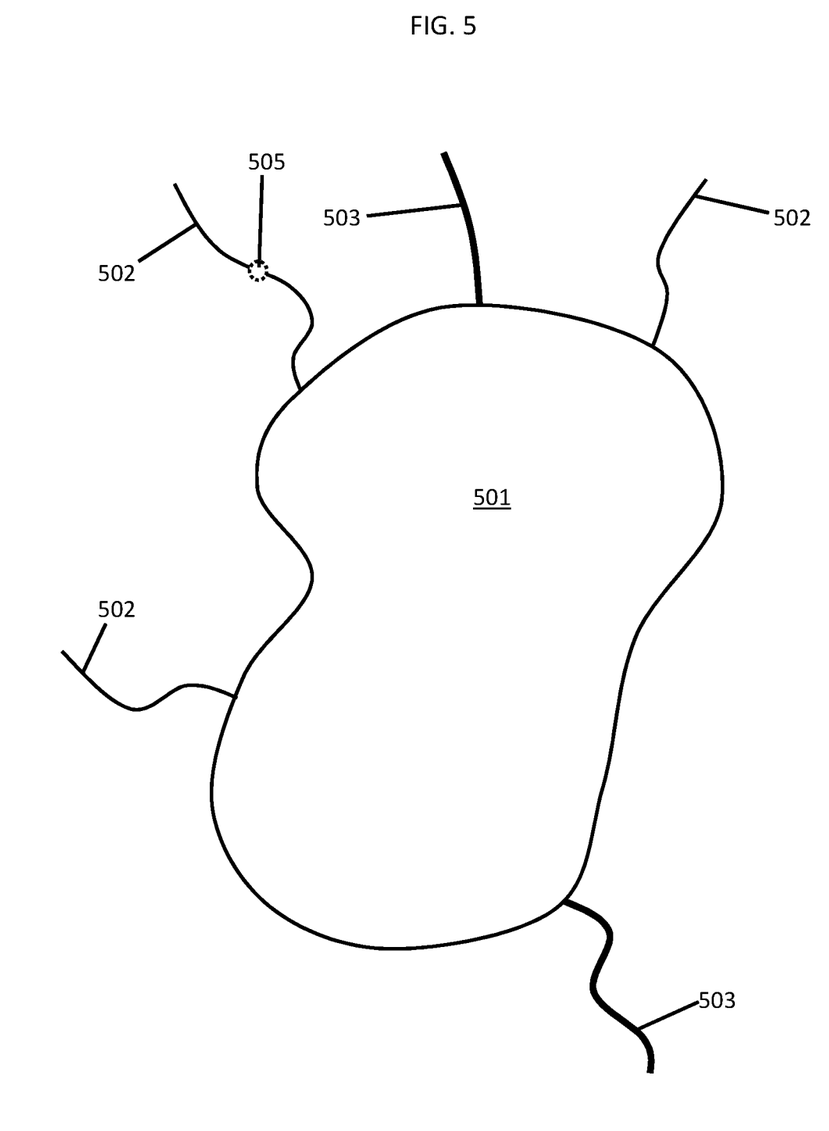
FIG. 5 is a schematic illustration of a geospatial location where a refined ENM is applicable in accordance with one or more embodiments.
Figure 6:
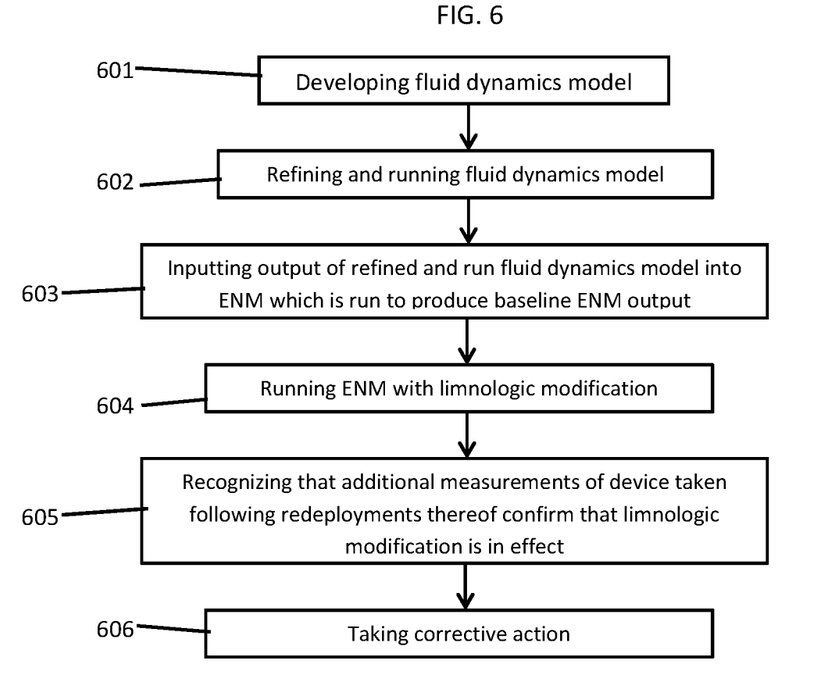
FIG. 6 is a flow diagram depicting a method of refining an ENM for a geospatial location in accordance with one or more embodiments.

In accordance with further embodiments and with reference to FIG. 5 and FIG. 6, a computer-implemented method is provided for refining an ENM that is associated with a geospatial location, such as a lake 501 that is fed by one or more tributary streams 502 and rivers 503. The method can be executed using the same or similar computational methods as those described above which need not be re-explained in detail.

As shown in FIGS. 5 and 6, the method includes initially developing a fluid dynamics model, at block 601, which is based on measurements generated by a device 505 that is deployed into fluid flows of the geospatial location (i.e., into the streams 502 and rivers 503) and, in some cases, to data reflective of local weather phenomena such as wind speed, precipitation, temperatures, etc. The device 505 can be provided as an automated vehicle (AV) or an automated underwater vehicle (AUW) and is configured to take at least temperature and velocity field, depth and particle transport measurements. Thus, the measurements of block 601 can include traditional ENM measurements such as temperature and velocity field measurements and depth measurements as well as additional, non-traditional measurements. The additional, non-traditional measurements can include particle transport measurements such as one or more of inert particle diffusion and invection measurements. As such, the fluid dynamics model is built to take into account, among other things, the chemical composition of the fluid flows as well as the nature of sedimentation of particles within the fluid flows and the tendency of particles within the fluid flows to be transferred from one point (e.g., within a stream 502 upstream from the lake 501) to another point (e.g., within the lake 501).

The method further includes refining and running the fluid dynamics model using the additional, non-traditional measurements as well as a second, third . . . , rounds of additional, non-traditional measurements that are regenerated from the device 505 being repeatedly redeployed into the fluid flows at block 602. In doing so, the fluid dynamics model produces an output that is descriptive of fluid dynamics at, in and around the geospatial location. At this point, the output of the refined and run fluid dynamics model is input into the ENM which is run to produce a baseline ENM output at block 603. This baseline ENM output is descriptive of a probability of a species existing at the geospatial location. Next, the ENM is run with a limnologic modification at block 604 to produce a predictive ENM output that is descriptive of a predictive probability of the species existing at the geospatial location and which is comparable to the baseline ENM output.

In accordance with embodiments, the limnologic modification of block 604 includes a potential change in a chemical composition of the fluid flows, a potential change in the velocity of the fluid flows or another similar type of change that might occur over time at the geospatial location. For example, where the device 505 is disposed in the stream 502, the limnologic modification may be a predicted rise in phosphorous or nitrogen in the stream 502 that results from an increased use of fertilizer nearby. Since such a rise would be expected to result in an algae bloom in the stream 502 and perhaps in the lake 501 in real-terms, the method provides for a process whereby the effect of the limnologic modification on a given species can be estimated. That is, if the given species is one that lives at the bottom of the lake and depends on sunshine reaching the bottom, the potential of an algae bloom occurring and thus blotting out the sun could be harmful and the methods described herein would confirm or refute that expectation.

In accordance with further embodiments, the method can further include recognizing that additional measurements of the device 505 taken following redeployments thereof confirm that the limnologic modification is in effect at block 605 and taking causing one or more corrective actions to be taken in order to counter the limnologic modification in effect at block 606. Here, the corrective action can include one or more of water redirection (e.g., causing the stream 502 to bypass the fertilizer inflow as shown in the bypass of FIG. 5), initiating treatment plant control changes (e.g., such as delaying water treatment processes until after the algae bloom) and issuing local policy modifications (such as requiring local farmers to limit their use of fertilizer). Yet another example of a corrective action could be configuring a feature of the device 505 to take a particular corrective action within the fluid flows themselves and then deploying the device 505 in the stream 502 or the lake 501 so that the device 505 could actually take that corrective action.

Figure 7:
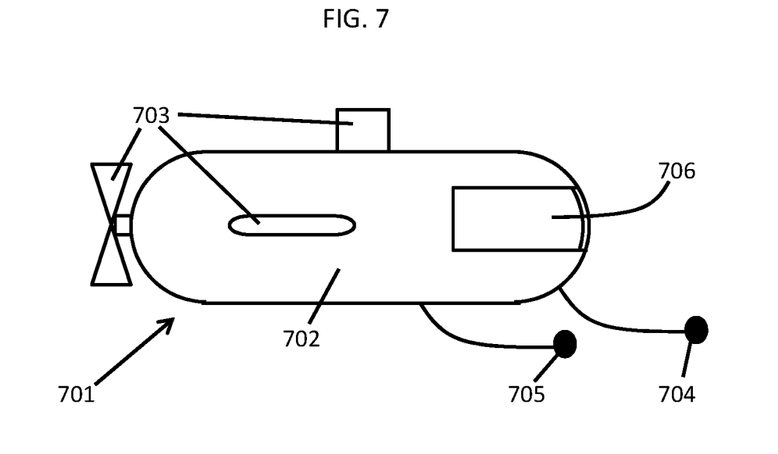
FIG. 7 is an automated vehicle (AV) that can be deployed into the fluid flows of the geospatial location of FIG. 5 in accordance with one or more embodiments.

With reference to FIG. 7, the device 505 of FIG. 5 can be provided as AV 701 or, more particularly, as an AUV. In any case, the AV 701 includes a housing 702, a navigational system 703, first and second arrays of sensors 704 and 705 and a corrective device 706. The housing 702 can be configured as an aerodynamic body with a fuselage, a tapered nose section and a tail section opposite the nose section. For those cases in which the AV 701 is provided for underwater usage, the housing 702 can be configured for submersion in water and for diving down to an appropriate depth. The navigational system 703 is configured to drive the housing 702 toward and through the fluid flows of the geospatial location so that the AV 701 can be positioned for the measurements to be taken. The first array of sensors 704 is supportively disposed on the housing 702 and is configured to take temperature and velocity field and depth measurements of the fluid flows. The second array of sensors 705 is supportively disposed on the housing and is configured to take particle transport measurements of the fluid flows.

In accordance with embodiments, the navigational system 703, the first and second arrays of sensors 704 and 705 and the corrective device 706 can be automatically controlled. Moreover, respective processors for the navigational system 703, the first and second arrays of sensors 704 and 705 and the corrective device 706 can be supported within the housing 702 (or may be remote) and are coupled to fluid dynamics and ecological niche models for the geospatial location.

In accordance with embodiments, the corrective device 706 can be supportively disposed on the housing 702 and can be configured to take any of one or more corrective actions with respect to the fluid flows in accordance with a determination being made that the corrective action is appropriate. For example, the corrective device 706 can be configured to affect a chemical composition or velocity of the fluid flows. In the former case, where the AV 701 is deployed to counter an increase in phosphorous or nitrogen in the stream 502 so as to prevent an algae bloom in the lake 501 that would otherwise harm a given species at the bottom of the lake 501, the corrective device 706 may be a tank of bleach that can be emptied into the stream 502 in a concentration that is controlled to counter the increased phosphorous and nitrogen without harming the species being protected.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for refining an ecological niche model (ENM) and countering a limnologic modification with which the ENM is run to produce a predictive ENM output, the computer-implemented method comprising:

developing a model based on measurements generated by a device deployed into flows, the measurements comprising temperature and velocity field, depth and particle transport measurements;

refining and running the model using measurements regenerated from the device being redeployed into the flows to produce an output;

running the ENM with the output as an input to produce a baseline ENM output descriptive of a probability;

running the ENM with athe limnologic modification to produce the predictive ENM output, the predictive ENM output being descriptive of a predictive probability that is comparable to the baseline ENM output;

recognizing that temperature and velocity field, depth and particle transport measurements of the device confirm that the limnologic modification is in effect;

determining that corrective action is appropriate to counter the limnologic modification; and taking corrective actions by a corrective device of the device with respect to the flows in accordance with the determination being made that the corrective action is appropriate to counter the limnologic modification.

2. The computer-implemented method according to claim 1, wherein:

the device comprises the corrective device to take the corrective actions to counter the limnologic modification, the corrective device is configured to affect a chemical composition of the flows and comprises a tank of bleach that can be emptied into the flows in a controlled concentration, and the device further comprises:

a submergible housing on which the corrective device is disposed;

a navigational system configured to drive the housing toward and through the flows into a position for the temperature and velocity field, depth and particle transport measurements to be taken; and first and second arrays of sensors configured to take temperature and velocity field and depth measurements and particle transport measurements, respectively.

3. The computer-implemented method according to claim 1, wherein the particle transport measurements comprise at least one of inert particle diffusion and invection measurements.

4. The computer-implemented method according to claim 1, wherein the developing of the model is based on the measurements and local weather data.

5. The computer-implemented method according to claim 1, wherein the limnologic modification comprises a change in a chemical composition of the flows.

6. The computer-implemented method according to claim 1, wherein the limnologic modification comprises a change in a velocity of the flows.

7. The computer-implemented method according to claim 1, wherein the corrective action comprises affecting a chemical composition or velocity of the flows.

8. The computer-implemented method according to claim 1, wherein:

the device comprises a tank of bleach configured to be emptied into the flows in a controlled concentration, the determining that corrective actions are appropriate to counter the limnologic modification comprises determining that an increase in phosphorous or nitrogen in the flows is in effect, and the taking of the corrective actions by the corrective device of the device with respect to the flows in accordance with the determination being made that the corrective actions are appropriate to counter the limnologic modification comprises emptying the tank of bleach into the flows in the controlled concentration to counter the increase.

9. A computer program product for refining an ecological niche model (ENM) and countering a limnologic modification with which the ENM is run to produce a predictive ENM output, the computer program product comprising:

a processor; and a computer readable storage medium having program instructions stored thereon, the program instructions being executable by the processor to perform a method comprising:

configuring a device to generate measurements comprising temperature and velocity field, depth and particle transport measurements;

causing the device to be deployed into flows to generate the measurements;

developing a model based on the measurements;

refining and running the model using measurements regenerated from the device being redeployed into the flows to produce an output;

running the ENM with the output as an input to produce a baseline ENM output descriptive of a probability;

running the ENM with the limnologic modification to produce athe predictive ENM output descriptive of a predictive probability that is comparable to the baseline ENM output;

recognizing that temperature and velocity field, depth and particle transport measurements of the device confirm that the limnologic modification is in effect;

determining that corrective actions are appropriate to counter the limnologic modification; and taking corrective actions by a corrective device of the device with respect to the flows in accordance with the determination being made that the corrective actions are appropriate to counter the limnologic modification.

10. The computer program product according to claim 9, wherein:

the device comprises: the corrective device to take the corrective actions to counter the limnologic modification, the corrective device is configured to affect a chemical composition of the flows and comprises a tank of bleach that can be emptied into the flows in a controlled concentration, and the device further comprises:

a submergible housing on which the corrective device is disposed;

a navigational system configured to drive the housing toward and through the flows into a position for the temperature and velocity field, depth and particle transport measurements to be taken; and first and second arrays of sensors configured to take temperature and velocity field and depth measurements and particle transport measurements, respectively.

11. The computer program product according to claim 9, wherein the particle transport measurements comprise at least one of inert particle diffusion and invection measurements.

12. The computer program product according to claim 9, wherein the developing of the model is based on the measurements and local weather data.

13. The computer program product according to claim 9, wherein the limnologic modification comprises a change in a chemical composition of the flows.

14. The computer program product according to claim 9, wherein the limnologic modification comprises a change in a velocity of the flows.

15. The computer program product according to claim 9, wherein the corrective actions comprises affecting a chemical composition or velocity of the flows.

16. The computer program product according to claim 9, wherein:
- the device comprises a tank of bleach configured to be emptied into the flows in a controlled concentration,
- the determining that corrective actions are appropriate to counter the limnologic modification comprises determining that an increase in phosphorous or nitrogen in the flows is in effect, and
- the taking of the corrective actions by the corrective device of the device with respect to the flows are in accordance with the determination being made that the corrective actions are appropriate to counter the limnologic modification comprises emptying the tank of bleach into the flows in the controlled concentration to counter the increase.

* * * * *